US006728779B1

United States Patent
Griffin et al.

(10) Patent No.: US 6,728,779 B1
(45) Date of Patent: Apr. 27, 2004

(54) METHOD AND APPARATUS FOR EXCHANGING ROUTING INFORMATION IN A PACKET-BASED DATA NETWORK

(75) Inventors: Timothy G. Griffin, Berkeley Heights, NJ (US); Gordon Thomas Wilfong, Gillette, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 563 days.

(21) Appl. No.: 09/583,595

(22) Filed: May 31, 2000

Related U.S. Application Data (60) Provisional application No. 60/168,281, filed on Dec. 1, 1999.

(51) Int. Cl.[7] .............................................. G06F 15/173
(52) U.S. Cl. ...................... 709/239; 709/238; 709/308; 370/469; 379/221.02; 714/4
(58) Field of Search ................................. 709/238, 239; 379/221.02; 370/469; 714/4

(56) References Cited

U.S. PATENT DOCUMENTS

| | | | | |
|---|---|---|---|---|
| 3,988,587 A | * | 10/1976 | Shreve et al. ................ | 250/253 |
| 4,656,658 A | * | 4/1987 | King .......................... | 379/221 |
| 4,825,206 A | * | 4/1989 | Brice, Jr. et al. ....... | 340/825.02 |
| 4,972,457 A | * | 11/1990 | O'Sullivan .................... | 379/59 |
| 5,398,277 A | * | 3/1995 | Martin, Jr. et al. ........... | 379/39 |
| 5,864,605 A | * | 1/1999 | Keshav ..................... | 379/88.01 |
| 5,898,826 A | * | 4/1999 | Pierce et al. .................... | 714/4 |
| 6,055,492 A | * | 4/2000 | Alexander, III et al. .... | 702/179 |
| 6,115,393 A | * | 9/2000 | Engel et al. ................. | 370/469 |
| 6,453,064 B1 | * | 9/2002 | Aikawa et al. ............. | 382/154 |
| 6,535,518 B1 | * | 3/2003 | Hu et al. ..................... | 370/401 |

FOREIGN PATENT DOCUMENTS

| | | | | |
|---|---|---|---|---|
| EP | 0817424 A2 | 1/1998 | ........... | H04L/12/28 |

OTHER PUBLICATIONS

Y. Rekhter and T. Li, "A Border Gateway Protocol," RFC 1771 ( BGP version 4), 1995.
J. W. Stewart, "Inter–Domain Routing in the Internet," BGP4, Addison–Wesley, 1998.
B. Halabi, "Internet Routing Architectures," Cisco Press, 1997.
T. G. Griffin and G. T. Wilfong, "An Analysis of BGP Convergent Properties," *SIGCOM '99*, 1999.
M. G. Gouda, "Elements of Network Protocol Design," John Wiley & Sons, Inc., 1998.
Griffin, T.G. et al., *IEEE INFOCOM 2000*, "A Safe Path Vector Protocol", pp. 490–499, Mar. 26–30, 2000.
Griffin, T.G. et al., *IEEE*, "Policy Disputes In Path–Vector Protocols", pp. 21–30, 1999.

* cited by examiner

*Primary Examiner*—Hosain Alam
*Assistant Examiner*—Liang-che Wang
(74) *Attorney, Agent, or Firm*—Stephen M. Gurey (57) ABSTRACT

Routing information is exchanged between edge routers in different autonomous systems that independently define their routing policies. A Simple Path Vector Protocol extends the prior art Border Gateway Protocol in a manner that is guaranteed to converge by adding a new attribute to the routing messages sent by an edge router to its peers in the different systems. This attribute is a path history, which is dynamically computed at each router as the routing path to a particular destination is changed. The path history attribute is sent in a routing message by a router to its peers together with the sending router's path to that destination. By observing the dynamic path history that is computed at a router as a received routing message from a peer router that contains a history attribute is processed, a cycle can be identified in the newly computed history and associated with a policy conflict at that receiving router's associated autonomous system. A path whose history contains a cycle is automatically suppressed as a permitted path to that destination.

26 Claims, 4 Drawing Sheets

METHOD AND APPARATUS FOR EXCHANGING ROUTING INFORMATION IN A PACKET-BASED DATA NETWORK

CROSS-REFERENCE

This application claims the benefit of U.S. Provisional Application No. 60/168,281, filed Dec. 1, 1999.

TECHNICAL FIELD

This invention relates to packet-based data networks. More particularly, this invention relates to the exchange of routing information between routers in such a network.

BACKGROUND OF THE INVENTION

In packet-based data networks such as the Internet, routers "talk" to each other to exchange routing information. Specifically, a router will announce the path it will use to get to a particular destination to each of its peer routers. Each router will thus know the path that its peer routers will take in sending a packet to a particular destination. Routing protocols, running on the routers, are used to exchange such information between routers. A routing protocol can be an Interior Gateway Protocol (IGP) or an Exterior Gateway Protocol (EGP). An IGP is used for routing within an administrative domain such as within a corporate backbone network or within a network that is owned by one company and has a unified administrative control over how routing is done. Generally such routing is metric-based in that the goal in routing between two points within an administrative domain is to find the route with the lowest cost, where cost may, for example, be distance or some other parameter than can be assigned to a link between routers. Examples of common routing protocols used within an IGP are the Routing Information Protocol (RIP), the Open Shortest Path First (OSPF) protocol, and the Intermediate System to Intermediate System (IS—IS) protocol. The advantageous property of such IGPs is that they are guaranteed to always achieve a stable routing within the network that is consistent with the network's configuration. The difference between the different routing protocols lies in the nature of the messages passed between routers. Since an IGP is used within a network that is owned or controlled by a single organization, no hostility exists between the owners of the routers within the network that might otherwise affect the willingness of a particular router in another network to accept traffic from a router owned by another.

An EGP is used to exchange routing information between autonomous administrative domains. Thus, border, or edge, routers that might link, for example, an autonomous AT&T network with an autonomous Sprint network, need to communicate via an EGP rather than an IGP. Unlike a single autonomous system in which routing can be metric based, routing between autonomous systems needs to be policy based. Each autonomous system may in fact want to protect itself from being used by others who are not paying for its use. Thus, one autonomous system may restrict routing through it from a competitor's system since it doesn't want such competitor's customers to use its resources, even though such routing would be the "shortest" path. EGPs, unlike metric-based IGPs, are thus policy based because autonomous systems will not always be able to agree as to the best path to a specified destination. As a result, an EGP is much more complicated to administer since it involves expressing a policy of how an administrative domain wants to interact with the rest of the world.

The Border Gateway Protocol (BGP) is currently the only interdomain routing protocol employed on the Internet (see, e.g., Y. Rekhter and T. Li, "A border gateway protocol", RFC 1771 [BGP version 4], 1995; J. W. Stewart, BGP4, *Inter-Domain Routing in the Internet*, Addison-Wesley, 1998; and B. Halabi, *Internet Routing Architectures*, Cisco Press, 1997). The BGP allows each autonomous system to independently formulate its own routing policies, and it allows these policies to override distance metrics in favor of policy concerns. However, routing policies of autonomous systems can conflict with each other. Inconsistencies in routing policies can result in several problems such as the inability to find a stable routing plan. Thus, as a change at one router occurs, information is exchanged with its peers that causes a second router to change its routing and exchange information with its peer routers, etc., etc., eventually causing the first router to change its routing again, then the second and so forth. Such a protocol is said to diverge and cause persistent route oscillations. Thus, with the BGP, edge routers between autonomous systems could continue to only exchange information without ever agreeing upon a stable routing plan. Such a situation could in fact have a catastrophic effect in the global Internet resulting in improperly routed traffic, and possibly even causing "gridlock" on the Internet with the amount of routing information being transferred from router to router. The latter could slow the network down to a crawl and, in a worst case situation, cause a "meltdown" of the Internet. Further, an autonomous system on the network has no ability to determine the cause of the routing problems since it only has local information available to it. Even further, even if it did, no one autonomous system has the ability to correct oscillations caused by inconsistency of routing policies between autonomous systems.

SUMMARY OF THE INVENTION

The problems associated with the prior art are solved by the routing protocol of the present invention. This new routing protocol, referred to herein as the Simple Path Vector Protocol (SPVP), extends the BGP by adding a new attribute to the routing messages sent by an edge router to its peers in different autonomous sytems. This additional attribute is a path history which is dynamically computed at each edge router as the routing path to a particular destination is changed. This path history attribute is thus sent by a router to its peers together with the sending router's path to that destination. Protocol oscillations caused by policy conflicts produce paths whose histories contain cycles. By observing the dynamic path history that is computed at an edge router as a received routing message from a peer router that contains a history attribute is processed, a cycle can be identified in the newly computed history and associated with a policy conflict at that receiving edge router's associated autonomous system. In further accord with the present invention, the protocol automatically suppresses as a permitted path to that destination those paths whose histories contain cycles.

DETAILED DESCRIPTION

The problem underlying the prior art BGP protocol is what is defined herein as the Stable Paths Problem (SPP). The SPP provides a simple semantics for routing policies of vector protocols such as BGP while remaining free of many of the nonessential details. Informally, the Stable Paths Problem consists of an undirected graph with a distinguished node called the origin. All other nodes have a set of permitted paths to the origin. Each node also has a ranking function on its permitted paths that indicates an order of preference. A solution to the Stable Paths Problem is an assignment of permitted paths to nodes so that each node's assigned path is its highest ranked path extending any of the assigned paths at its neighbors. Such a solution does not represent a global maximum, but rather an equilibrium point in which each node is assigned its local maximum.

The concepts are mathematically formalized as follows. A simple, undirected connected graph $G=(V, E)$ represents a network of nodes $V=\{0,1,2, \ldots n\}$ connected by edges $E$. For any node u, $peers(u)=\{w|\{u,w\}\in E\}$ is the set of peers for u. It is assumed that node 0, called the origin, is special in that it is the destination to which all other nodes attempt to establish a path.

A path in G is either the empty path, denoted $\epsilon$, or a sequence of nodes, $(v_k\ v_{k-1} \ldots v_1\ v_0)$ such that for each $i,k \geq i>0$, $\{v_i, v_{i-1}\}$ is an edge in E. It is assumed that all non-empty paths $P=(v_k\ v_{k-1} \ldots v_1\ v_0)$ have a direction from the first node $v_k$ to the last node $v_0$. Suppose $e=\{u, v\}$ is an edge in E. If P and Q are non-empty paths such that the first node in Q is the same as the last node in P, then PQ denotes the path formed by the concatenation of these paths. This is extended with the convention that $\epsilon P=P\epsilon=P$, for any path P. For example, (4 3 2) (2 1 0) represents the path (4 3 2 1 0), whereas $\epsilon$(2 1 0) represents the path (2 1 0). This notation is most commonly used when P is a path starting with node v and $\{u, v\}$ is an edge in E. In this case (u v) P denotes the path that starts at node u, traverses the edge $\{u, v\}$, and then follows path P from node v.

For each $v \in V-\{0\}$, the set $A^v$ denotes the permitted paths from v to the origin (node 0). If $P=(v\ v_k \ldots v_1\ 0)$ is in $A^v$ then the node $v_k$ is called the next hop for path P. Let $A=\{A^v | v \in V-\{0\}\}$ be the set of all permitted paths.

For each $v \in V-\{0\}$, there is a non-negative, integer-valued ranking function $\lambda^v$, defined over $A^v$, which represents how node v ranks its permitted paths. If $P_1, P_2 \in A^v$ and $\lambda^v(P_1)<\lambda^v(P_2)$, then $P_2$ is said to be preferred over $P_1$. Let $\Lambda=\{\lambda^v | v \in V-\{0\}\}$.

An instance of the Stable Paths Problem, $S=(G, A, \Lambda)$, is a graph together with the permitted paths at each non-zero node and the ranking function for each non-zero node, where the following restrictions hold on $\Lambda$ and A:

1) (empty path is permitted) $\epsilon \in A^v$;
2) (empty path is lowest ranked) $\lambda^v(\epsilon)=0$;
3) (strictness) If $\lambda^v(P_1)=\lambda^v(P_2)$, then $P_1=P_2$ or there is a u such that $P_1=(v\ u)P_1'$ and $P_2=(v\ u)P_2'$ (paths $P_1$ and $P_2$ have the same next-hop); and
4) (simplicity) If path $P \in A^v$, then P is a simple path (no repeated nodes).

Let $S=(G, A, \Lambda)$ be an instance of the Stable Paths Problem. Given a node u, suppose that W is a subset of the permitted paths $A^u$ such that each path in W has a distinct next hop. Then the maximal path in W, max(u, W), is defined to be:

$$\max(u,\ W) = \begin{cases} P \in W \text{ with maximal } \lambda^u(P) & (W \neq \phi) \\ \epsilon & o.w. \end{cases}$$

A path assignment is a function $\pi$ that maps each node $u \in V$ to a path $\pi(u) \in A^u$. It should be noted that $\pi(u)$ may be the empty path. The set of path choices (u, $\pi$) is defined to be all $P \in A^u$ such that either P=(u 0) and $\{u, 0\} \in E$ or $P=(u\ v)\pi(v)$ for some $\{u,v\} \in E$. The path assignment $\pi$ is stable at node u if:

$\pi(u)=\max(u, \text{choices}\ (u,\pi))$

The path assignment $\pi$ is stable if it is stable at each node u. A path assignment can be written as a vector, $(P_1, P_2, \ldots, P_n)$, where $\pi(u)=P_u$.

The Stable Paths Problem $S=(G, A, \Lambda)$ is solvable if there is a stable path assignment for S. A stable path assignment is called a solution for S. If no such assignment exists, then S is unsolvable.

Figure 1:
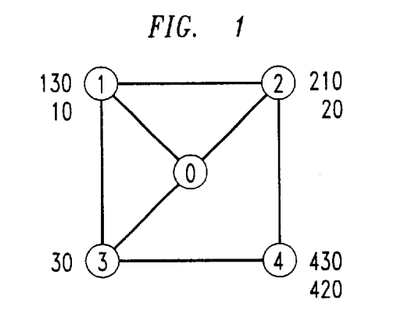
FIG. 1 shows network comprising a group of interconnected nodes, each representing an autonomous system, and the permitted paths to the origin at node 0 from each other node, ordered in preference.
Figure 2:
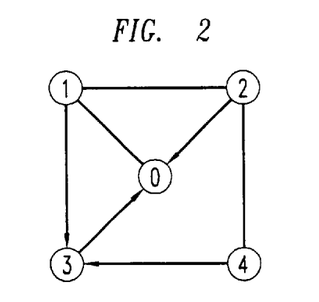
FIG. 2 shows a stable path assignment of the network in FIG. 1.

FIG. 1 illustrates a Stable Paths Problem for a 5-node network, the destination node being node 0. The ranking function for each non-zero node is depicted by the vertical list next to each node, with the highest ranked path being listed first and going down on the list to the lowest ranked non-empty path. The empty path is omitted from each list. The path assignment ((1 3 0), (2 0), (3 0), (4 3 0))

is illustrated in FIG. 2. This is the unique solution to this problem since no other path assignment is stable. For example, the path assignment $\pi$=((1 0), (2 0), (3 0), (4 3 0))

is not stable since it is not stable for nodes 1 and 2. This can be seen by noting that choices(1, $\pi$)={(1 0), (1 3 0)} choices(2, $\pi$)={(2 0), (2 1 0)} and so max(1, choices(1,$\pi$))=(1 3 0)@$\pi$(1) and max(1, choices(2,$\pi$))=(2 1 0)$\neq \pi$(2).

Figure 3:
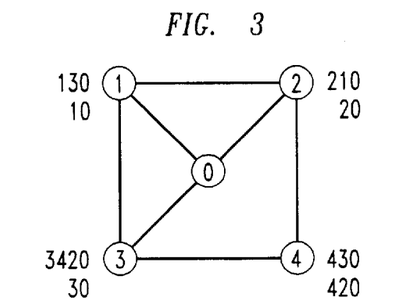
FIG. 3 also shows a network comprising a group of interconnected nodes, similar to FIG. 1, with an additional permitted path and preferred path from node 3, but which solution of path assignments can diverge.
Figure 4:
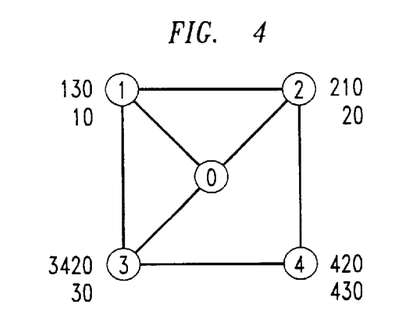
FIG. 4 shows a modification of the network in FIG. 3, with a re-ordering of preferred permitted paths to the origin at node 4, and which has no solution and which will always diverge.

A modification of the network in FIG. 1 is shown in FIG. 3. This arrangement adds one permitted path (3 4 2 0) for node 3, yet it has the same unique solution as the network in FIG. 1. As will be later explained, the distributed evaluation of this specification can diverge. By reordering the ranking of paths at node 4 in FIG. 3, the network of FIG. 4 is produced. This specification has no solution and its distributed evaluation will always diverge.

Three Simple Path Vector Protocols (SPVPs) for solving the Stable Paths Problem in a distributed manner are now presented. The first, SPVP$_1$, is an abstract version of the prior art BGP protocol and represents the state of the art prior to the present invention. This protocol will always diverge when a SPP has no solution. It can also diverge for SPPs that are solvable. The prior art SPVP$_1$ protocol is then modified in accordance with the present invention by adding a dynamically computed attribute, called the path history, to the routing messages transmitted to neighboring nodes. This protocol, in accordance with the present invention, is designated as SPVP$_2$. SPVP$_2$ is not safe. However, policy oscillations caused by policy conflicts produce paths whose histories contain "event cycles." These cycles identify the policy conflicts and the network nodes involved. An extension to SPVP$_2$, SPVP$_3$, further in accordance with the invention, is safe in that it automatically suppresses paths whose histories contain cycles.

The SPVP$_1$ protocol differs from the simpler model of evaluation presented in the prior art, for example, by the inventors herein in "An analysis of BGP convergent properties", *SIGCOMM'99*, 1999; and by B. Halabi, in the aforenoted *Internet Routing Architectures*. A message processing framework is used herein which employs a reliable FIFO queue of messages for communication between peers. The use of histories in the SPVP$_2$ and SPVP$_3$ protocols of the present invention employ message queues that preserve message ordering and ensure no message loss. This is consistent with implementations of the prior art BGP which use TCP and message queues to implement this abstraction.

In SPVP$_1$, the messages exchanged between peers are simply paths. When a node u adopts a path P∈A" it informs each w∈peers(u) by sending path P to w. There are two data structures at each node u. The path rib(u) is u's current path to the origin. For each w∈peers(u), rib-in(u←w) stores the path sent from w most recently processed at u. The set of path choices available at node u is defined to be choices(u)={(u w)P∈A"|P=rib-in(u←w)}, and the best possible path at u is defined to be best(u)=max(u, choices(u)).

This path represents the highest ranked path possible for node u, given the messages received from its peers.

The process spvp$_1$[u] that runs at each node u is as follows:

```
process spvp₁[u]
begin
        receive P from w →
            begin
                rib-in (u ← w) := P
                if rib(u) ≠ best(u) then
                begin
                    rib(u) := best(u)
                    for each v ∈ peers(u) do
                    begin
                        send rib(u) to v
                    end
                end
            end
end
```

The notation and semantics are similar to that used by M. G. Gouda in *Elements of Network Protocol Design*, John Wiley & Sons, Inc., 1998. If there is an unprocessed message from any w∈peers(u), the guard receive P from w can be activated causing the message to be deleted from the incoming communication link and processed according to the program to the right of the arrow (→). It is assumed that this program is executed in one atomic step and that the communication channels are reliable and preserve message order. This protocol ensures that rib-in(u←w) always contains the most recently processed message from peer w and that rib(u) is always the highest ranked path that u can adopt that is consistent with these paths.

The network state of the system is the collection of values rib(u), rib-in(u←w), and the state of all communication links. It should be clear than any network state implicitly defines the path assignment π(u)=rib(u). A network state is stable if all communication links are empty. It can be shown that the path assignment associated with any stable state is always a stable path assignment, and thus a solution to the Stable Paths Problem S. However, the converse if this theorem indicates that SPVP is not safe. That is, if S has no solution, then SPVP cannot converge to a stable state.

If the network in FIG. 4 is considered using SPVP$_1$, a sequence of network states can be constructed that are associated with the path assignments in Table 1 below. In Table 1, an underlined path indicates that it has changed from the previous path assignment. Thus, at step 0, the path to the origin from each of the nodes is at an initial state: the path from node 1 to the origin is direct (1 0), its second preferred choice, the path from node 2 is also direct (2 0), its second preferred choice, the path from node 3 is via node 4 to node 2 to the origin (3 4 2 0), its highest preferred choice, and the path from node 4 is via node 2 to the origin (4 2 0), also its highest preferred choice. At step 1, node 2 wakes up and sees that node 1 is going directly to the origin. Thus it changes

TABLE 1

| step | π |
|---|---|
| 0 | (10) (20) (3420) (420) |
| 1 | (10) (210) (3420) (420) |
| 2 | (10) (210) (3420) ε |
| 3 | (10) (210) (30) ε |
| 4 | (10) (210) (30) (430) |
| 5 | (130) (210) (30) (430) |
| 6 | (130) (20) (30) (420) |
| 7 | (130) (20) (3420) (420) |
| 8 | (130) (20) (3420) (420) |
| 9 | (10) (20) (3420) (420) | its path to (2 1 0), which is its preferred path. At step 2, node 4 wakes up and sees that node 2 is no longer going directly to the origin. It therefore cannot use (4 2 0), nor can it use its second choice (4 3 0) since node 3 does not go directly to the origin. It is thus assigned the empty path, ε. If a packet were to arrive directed to d at the origin, the packet would be thrown out by its inability to be routed to node 0. At step 3, node 3 is fired. Since node 4 is no longer forwarding its traffic to node 0, node 3 changes its path to the direct path (3 0), its second choice. At step 4, node 4 is fired. Since node 3 is now going directly to the origin, node 4 can get out of its empty state and change its path to (4 3 0), its second choice. At step 5, node 1 is fired. Since node 3 is going direct, node 1 can change its path to it first choice (1 3 0). At step 6, node 2 is fired. Since node 1 is not going direct anymore, node 2 must change its path to its second choice (2 0). At step 7, node 4 is fired. Since node 2 is now going directly to the origin, node 4 can change its path to its first preferred path (4 2 0). At step 8, node 3 is fired. Since node 4 is now going to the origin via node 2, node 3 changes its path to its first choice (3 4 2 0). At step 9, node 1 is fired. Since node 3 is no longer going directly to the origin, node 1 must change its path to its second choice (1 0). As can be noted, we are now back to the same path assignments that we started with at step 0. This represents one round of an oscillation.

It should be noted that even if a solution exists, SPVP$_1$ is not guaranteed to converge. Such a sequence of states can also be constructed for the network in FIG. 3, which has a solution. Whereas the network in FIG. 4 is unable to exit this oscillation, the network in FIG. 3 can oscillate for an arbitrary amount of time before converging on a solution. In other words, the network of FIG. 3 can produce both persistent and transient oscillations.

In Table 1, the sequence of events that led node 2 to adopt the path (2 0) at step 6 can be explained as follows. Suppose that node u transitions from rib(u)=P$_{old}$ to rib(u)=P$_{new}$. We say that node u went down from P$_{old}$ if u ranks path P$_{new}$ lower than path P$_{old}$. Similarly, we say that node u went up to path P$_{new}$ if u ranks path P$_{old}$ lower than path P$_{new}$. Node 3's path (2 0) at step 6 can be explained this way: node 2 adopted path (2 0) because it went down from (2 1 0)

because node 1 went up to (1 3 0) because node 3 went down from (3 4 2 0) because node 4 went down from (4 2 0) because node 2 went up to (2 1 0). Thus, it can be seen that there is a circularity involved −2 went down from (2 1 0) because . . . 2 went up to (2 1 0).

A path change event is defined to be a pair e=(s, P) where s∈{+, −} is the sign of e and P is a path. If e is a path change event, then sign (e) denotes the sign of e. Suppose $P_{old}$ and $P_{new}$ are paths permitted at node u. Then the event (+, $P_{new}$) means that u went up to $P_{new}$, and the event (−, $P_{old}$) means that u went down from $P_{old}$. A path history h is either the empty history ◊, or a sequence h=$e_k e_{k-1} \ldots e_1$, where each $e_i$ is a path change event. Intuitively, event $e_{i+1}$ occurred after event $e_i$, so the most recent event is $e_k$. Such a history contains a cycle if there exists i,j, with k≧j>i≧1, such that $e_i$=($s_i$, P) and $e_j$=($s_2$, P). For ease of notation, a path change event such as (−, (3 4 2 0)) is written in the simpler form (− 3 4 2 0).

Using this notation the explanation for the path (2 0) at node 2 can be restated as:

(− 2 1 0) (+ 1 3 0) (− 3 4 2 0) (− 4 2 0) (+ 2 1 0).

This history is noted to contain a cycle.

The prior art $SPVP_1$ is now extended to the present invention's $SPVP_2$, which dynamically computes such histories in a distributed manner. A message m is a pair (P, h) where P is a path and h is a history. The intent is that h describes a sequence of path change events that allowed P to be adopted. For any message m=(P, h), define path(m)=P and history(m)=h. The set of choices at node u, choices(u), is now redefined to be {(u w)P∈A"|P=path(rib-in(u←w))}.

Similarly, the path assignment associated with a network state is now π(u)=path(rib(u)).

The process $spvp_2[u]$ that implements $SPVP_2$ at node u is as follows:

```
process spvp₂[u]
  begin
    receive m from w →
      begin
        rib-in(u ⇐ w) := m
        if path(rib(u)) ≠ best_B(u) then
          begin
            P_old := path(rib(u))
            P_new := best(u)
            h_new := hist(u)
            rib(u) := (P_new, h_new)
            for each v ∈ peers(u) do
              begin
                send rib(u) to v
              end
          end
      end
  end
```

This process uses the auxiliary function hist(u) to compute a new path history for $P_{new}$ whenever the best path at node u changes from $P_{old}$ to $P_{new}$. This function is defined in Table 2. If u goes up to $P_{new}$=(u w)$P_2$, then the history

TABLE 2

| hist(u) | condition |
|---|---|
| (+, $P_{new}$) h | if $\lambda^u(P_{old}) < \lambda^u(P_{new})$, $P_{new}$ = (u w)$P_2$, and rib-in(u ⇐ w) = ($P_2$, h), |

TABLE 2-continued

| hist(u) | condition |
|---|---|
| (−, $P_{old}$) h | if $\lambda^u(P_{old}) > \lambda^u(P_{new})$, $P_{old}$ = (u w)$P_1$, |
| (s, Q) h | rib-in(u ⇐ w) = ($P_2$, h), if $\lambda^u(P_{old}) = \lambda^u(P_{new})$, $P_{old}$ = (u w)$P_1$, $P_{new}$ = (u w)$P_2$, rib-in(u ⇐ w) = ($P_2$, h), h = e h', s = sign (e), and $Q = \begin{cases} P_{old} & \text{if } s = - \\ P_{new} & \text{if } s = + \end{cases}$ | of this path at u is (+, $P_{new}$)h, where h is the history of $P_2$ received from w explaining why w adopted $P_2$, $P_2$ being a specific sub-path of the new path from peer w to the destination and $P_{new}$ being an extension of that sub-path from u to the destination. If u goes down from $P_{old}$=(u w)$P_1$, then the history of the new path at u is (−, $P_{old}$)h, where h is the history of the most recent path from w explaining why w abandoned $P_1$, $P_1$ being a specific sub-path of the old path from peer w to the destination and $P_{old}$ being the extension of that sub-path from u to the destination. Finally, if u changes paths to one of equal rank, then both paths must be from the same peer w. (This follows from the strictness condition imposed on ranking functions described above.) Node u generates a path change event (s, Q), where the sign s is taken from the most recent message received from w. The path Q is chose to be consistent with this sign in the following sense. If s=−, then w went down, and u will agree with w and generate the event (−, $P_{old}$). If s=+, the w went up, and again u will agree with w and generate the event (+, $P_{new}$). This is just one of many ways of handling the case where the rank order of the new path is equal to the rank order of the old path.

Table 3 presents a dynamic trace for $SPVP_2$ that replays the sequence

TABLE 3

| step | u | best(u) | hist(u) |
|---|---|---|---|
| 0 | 1 | (10) | ◊ |
|   | 2 | (20) | ◊ |
|   | 3 | (3420) | ◊ |
|   | 4 | (420) | ◊ |
| 1 | 1 | (10) | ◊ |
|   | 2 | (210) | (+210) |
|   | 3 | (3420) | ◊ |
|   | 4 | (420) | ◊ |
| 2 | 1 | (10) | ◊ |
|   | 2 | (210) | (+210) |
|   | 3 | (3420) | ◊ |
|   | 4 | ε | (−420)(+210) |
| 3 | 1 | (10) | ◊ |
|   | 2 | (210) | (+210) |
|   | 3 | (30) | (−3420)(−420)(+210) |
|   | 4 | ε | (−420)(+210) |
| 4 | 1 | (10) | ◊ |
|   | 2 | (210) | (+210) |
|   | 3 | (30) | (−3420)(−420)(+210) |
|   | 4 | (430) | (+430)(−3420)(−420)(+210) |
| 5 | 1 | (130) | (+130)(−3420)(−420)(+210) |
|   | 2 | (210) | (+210) |
|   | 3 | (30) | (−3420)(−420)(+210) |
|   | 4 | (430) | (+430)(−3420)(−420)(+210) |

TABLE 3-continued

| step | u | best(u) | hist(u) |
|---|---|---|---|
| 6 | 1 | (130) | (+130)(−3420)(−420)(+210) |
|   | 2 | (20) | (−210)(+130)(−3420)(−420)(+210) |
|   | 3 | (30) | (−3420)(−420)(+210) |
|   | 4 | (430) | (+430)(−3420)(−420)(+210) |
| 7 | 1 | (130) | (+130)(−3420)(−420)(+210) |
|   | 2 | (20) | (−210)(+130)(−3420)(−420)(+210) |
|   | 3 | (30) | (−3420)(−420)(+210) |
|   | 4 | (420) | (+420)(−210)(+130)(−3420)(−420)(+210) |
| 8 | 1 | (130) | (+130)(−3420)(−420)(+210) |
|   | 2 | (20) | (−210)(+130)(−3420)(−420)(+210) |
|   | 3 | (3420) | (+3420)(+420)(−210)(+130)(−3420)(−420)(+210) |
|   | 4 | (420) | (+420)(−210)(+130)(−3420)(−420)(+210) |
| 9 | 1 | (10) | (−130)(+3420)(+420)(−210)(+130)(−3420)(−420) |
|   | 2 | (20) | (+210) |
|   | 3 | (3420) | (−210)(+130)(−3420)(−420)(+210) |
|   | 4 | (420) | (+3420)(+420)(−210)(+130)(−3420)(−420)(+210) (+420)(−210)(+130)(−3420)(−420)(+210) | presented above in Table 1 for the network in FIG. 4. The column best(u) indicates the route chosen as the best route for that u. At step 6, node 2 has exactly the history previously described. For another example, at step 4, rib(4)=((4 3 0), h), where h=(+ 4 3 0) (− 3 4 2 0) (− 4 2 0) (+ 2 1 0). This history can be read as: node 4 went up to (4 3 0) because node 3 went down from (3 4 2 0) because node 4 went down from (4 2 0) because node 2 went up to (2 1 0).

At step 9 every node contains a cycle in its history. Since the network in FIG. 4 has no solution, these histories would grow in an unbounded manner if the evaluation continued. Note that without the histories, each node would see an oscillation of its path to the origin, but it would not be able to identify this as a policy-based oscillation.

Using $SPVP_2$, the presence of cycles in path histories is used to alert nodes to the fact that a policy-based oscillation has been dynamically realized. $SPVP_3$ extends $SPVP_2$ to a safe protocol by using this information to suppress selected paths, effectively eliminating them from the set of permitted paths. This process of elimination can continue until no protocol oscillation is possible. The resulting solution is then not a solution to the original Stable Paths Problem, but rather to a subproblem.

Several approaches are possible. In an exemplary approach, an additional data structure, B(u), is added to each node. That data structure, B(u) contains a set of bad paths. The definition of the auxiliary function best(u) is then modified so that it never considers paths in the set B(u). Defining $choices_B(u)$ to be:

{(u w)P∈(A″−B(u))|P∈rib-in(u←w)} and $best_B(u)$=max(u, $choices_B(u)$).

$SPVP_2$ is then modified so that if u would construct a history containing a cycle for path $P_{new}=best_B(u)$, then it adds path $P_{new}$ to the set B(u) and recomputes $P_{new}=best_B(u)$ with this modified B(u). If $P_{new} \neq P_{old}$, then u must have gone down from $P_{old}$. In this case, the history of a new path is truncated to (−, $P_{old}$) to ensure that the resulting history does not contain a cycle. The process $SPVP_3$ is detailed as follows:

```
process spvp₃[u]
begin
    receive m from w →
        begin
            rib-in(u ⇐ w) := m
            if path(rib(u)) ≠ bestB(u) then
                begin
                    Pold := path(rib(u))
                    Pnew = bestB(u)
                    hnew := hist(u)
                    if hnew contains a cycle then
                        begin
                            B(u) := B(u) U {Pnew}
                            Pnew := bestB(u)
                            if Pnew ≠ Pold then
                                begin
                                    hnew := (-, Pold)
                                end
                        end
                    if Pnew ≠ Pold then
                        begin
                            rib(u) := (Pnew, hnew)
                            for each V ∈ peers(u) do
                                begin
                                    send rib(u) to v
                                end
                        end
                end
        end
end
```

For the evaluation of the network in FIG. 4 presented above in Table 3, this results in convergence to the path assignment ((1 3 0), ε, (3 0), (4 3 0)).

In the transition from step 5 to step 6 node 2 first constructs a cycle in the history of path (2 0), (− 2 1 0) (+ 1 3 0) (− 3 4 2 0) (− 4 2 0) (+ 2 1 0).

Because of this it adds path (2 0) to its set of bad paths B(2). It then adopts the empty path, which results in a stable state. This is exactly the solution to the Stable Paths Problem obtained from the network in FIG. 4 by deleting path (2 0) from the set of permitted paths.

As described hereinabove, the nodes represent autonomous systems which may each include a plurality of edge routers. Each edge router in an autonomous system communicates with the edge routers in the other autonomous systems as well as the routers that are internal to its own system. In addition to a plurality of internal routers, each autonomous system includes other computers connected to its internal network. Although the terminology used above applies to the IP world, the protocol of the present invention is also applicable for use in other packet-based data networks such as, for example, ATM and frame relay.

Figure 5:
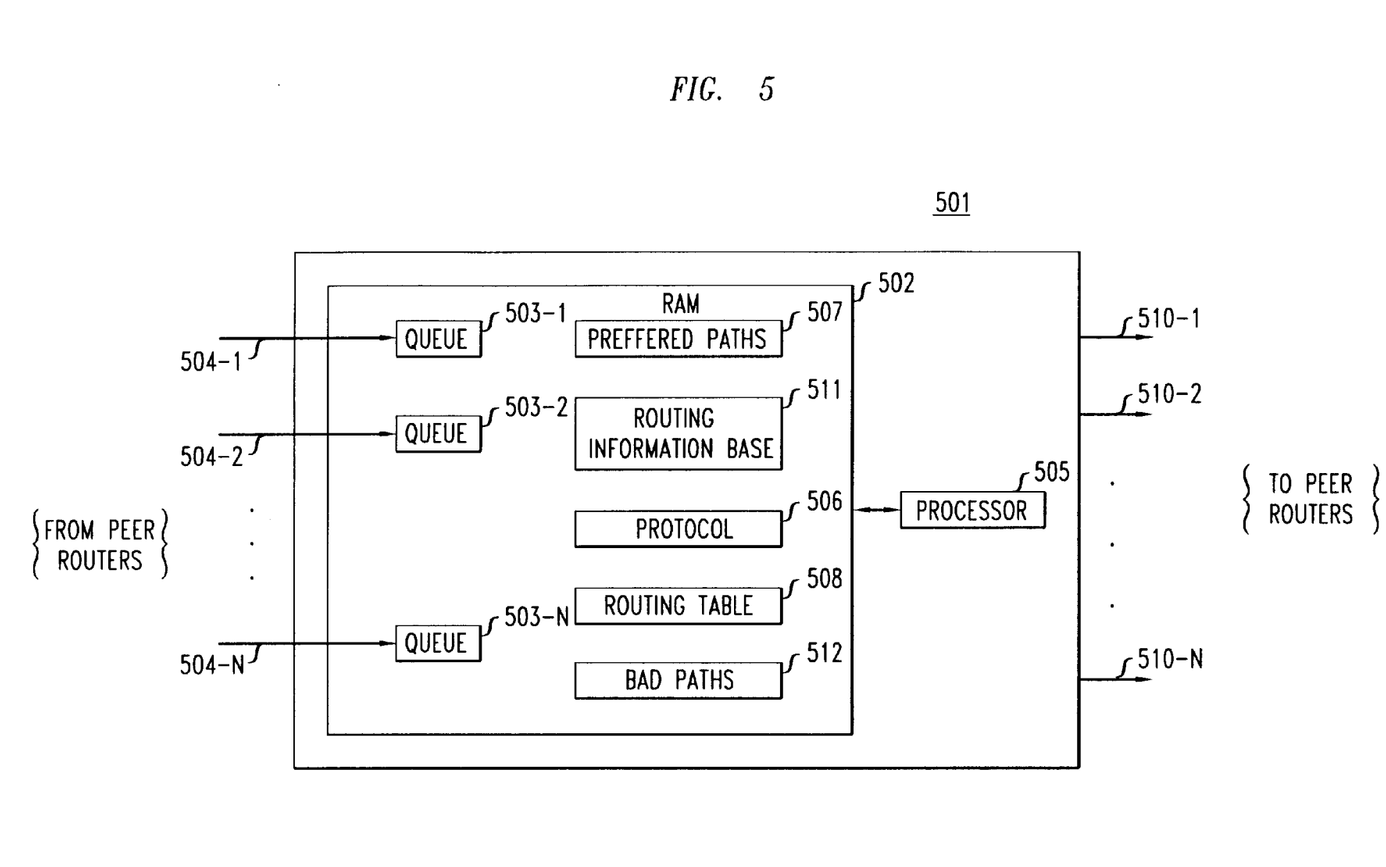
FIG. 5 is a block diagram of a router that functions in accordance with the protocol of the present invention.

With reference to FIG. 5, a block diagram of an edge router 501 that is running the protocol of the present invention is shown. Shown and described are mainly only those aspects and components of the router that apply to receiving routing messages from its peer routers, acting upon such received messages in accordance with the present invention, and forwarding routing messages to the peer routers. The primary functions of the router, viz., forwarding a received packet to its next hop as it progresses towards it addressed destination in accordance with the stored routing for that destination, are not shown nor described since they are not part of the present invention and are obvious to one skilled in the art. Router 501 includes RAM 502, which includes sub-memory areas 503-1–503-N, each of the latter forming a queue for storing successively received routing messages on one of the inputs 504-1–504-N from one of the N peer routers of router 501. Each message indicates, for a particular destination, the current path that that peer router uses to send a packet to that destination. In addition, and in accordance with the present invention described above, that message further includes the aforedescribed history attribute associated with that path that indicates how that peer arrived at that particular path choice via a series of signed path change events that occurred at it and other routers. As each routing message arrives at router 501 from a peer router, it is stored in its appropriate queue in one of the sub-memory areas 503 for subsequent processing by router's processor 505 in accordance with the protocol. The code that realizes the pseudo-code of the SPVP$_3$ protocol described above is stored in RAM 502 in memory area 506 and is executed by processor 505. RAM 502 also includes memory area 507 in which is stored a list for each destination of the paths to that destination from this router sorted by this router's preference. A routing table is stored in memory area 508 of RAM 502, which indicates for each destination, the particular path that an incoming packet to that destination will be directed by that router as well as a history attribute associated with that router. The router will thus send an incoming packet addressed to that destination to an appropriate output port 510-1–510-N, which is connected to the one peer router, to which that packet should next be directed. Further, a routing information base (rib) is stored in memory area 511 of RAM 502, which indicates for each destination what each of the peer routers has chosen as its path to that destination and the history associated with that chosen path. Memory area 512 contains the set of the aforedescribed bad paths, B(u), that the router will not consider as a path to the destination when selecting the most preferred permitted path to that destination. As previously described, the paths in this set, B(u), are those paths whose associated histories would contain a cycle if such path were chosen. Rather than using a separate memory area, those paths that would yield a cycle in their histories can alternatively be eliminated as choices in memory area 507, which contains the list of permitted paths in order of their preference.

Figure 6:
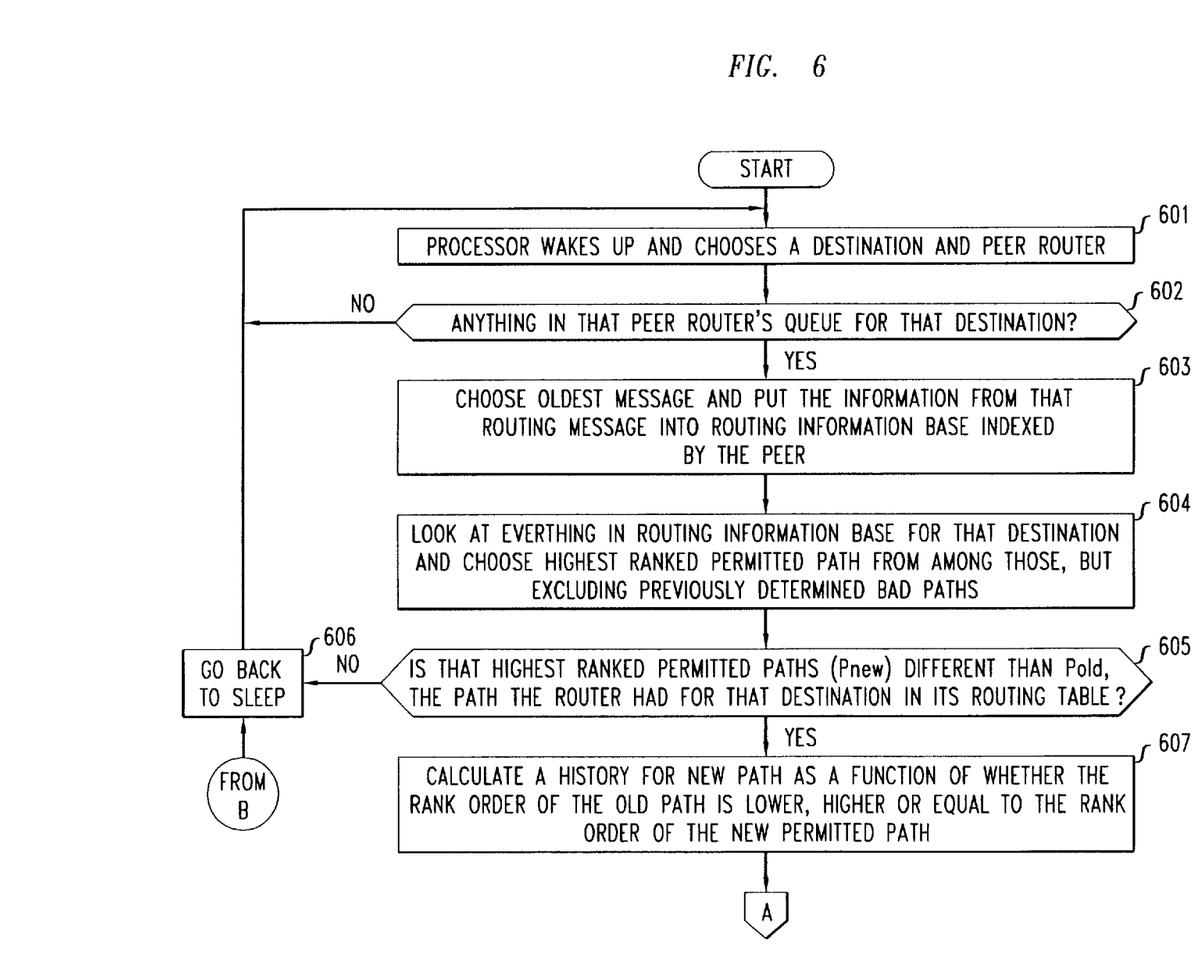
FIGS. 6–7 together show a flow chart detailing the steps of the protocol of the present invention at a particular router.
Figure 7:
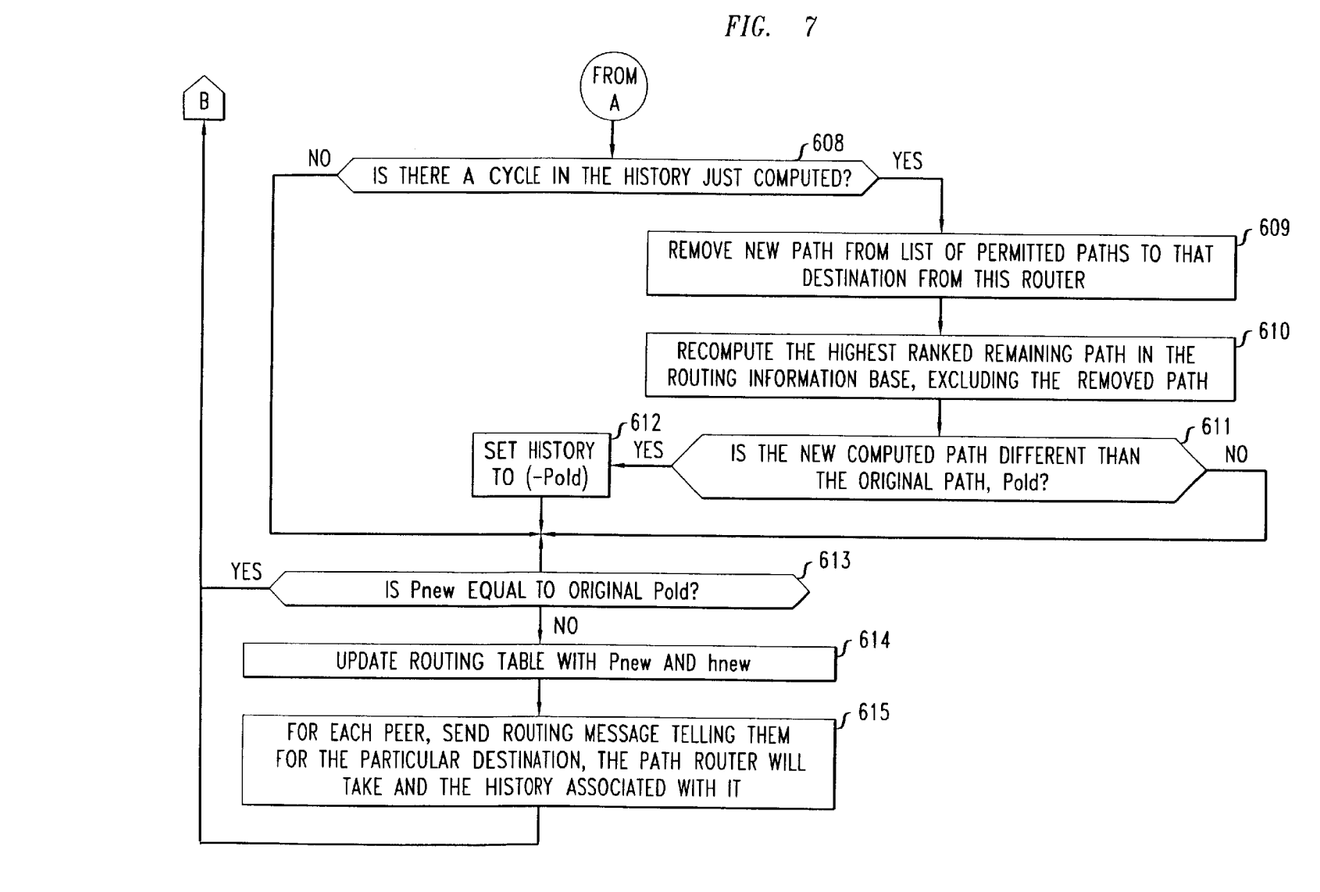

The functions of a router such as the router 501 in FIG. 5, as it receives a routing message from a peer router, processes the routing message, and outputs routing messages to its peers, all in accordance with the present invention, are described in connection with the flow chart in FIGS. 6–7. At step 601, the processor 505 wakes up and chooses a destination and a peer router whose input queue (503-1–503-N) it will select for examination. At step 602, the processor determines whether there are any routing messages in that chosen peer's queue for that destination. At step 603, the oldest routing message for that destination in that peer's queue is chosen and the information from that routing message (the path and the history associated with the path) is put into the routing information base 511, indexed by the particular peer. At step 604, every entry in the routing information base for that destination is examined, including the new entry that has just replaced an old entry. The path in each entry represents a path that a peer will take to that destination. By prepending the current router to each of the paths in the routing information base to that destination, all possible routes to that destination are determined. Not each of those paths, however, is a permitted path in accordance with this router's stored rank-ordered list of permitted paths 507. At this step 604, from among only those paths that are permitted and excluding the bad paths previously determined and stored in the bad path memory area 512, the highest ranked path in the routing information base is chosen. At step 605, a determination is made whether that highest ranked permitted path ($P_{new}$) is different than the old path ($P_{old}$) that the router had in its routing table for that destination. If it is not different, then, at step 606, the processor goes back to sleep and returns to the beginning to await reawakening again at step 601. If $P_{new}$ is different than $P_{old}$, then, at step 607, a history for the new path is computed as a function of whether the rank order of the old path is lower, higher, or equal to the rank order of the new permitted path, This history is computed in accordance with Table 2, described above. At step 608, a determination is made whether there is a cycle in the just computed history. If there is, then, at step 609, the new path is added to the list of bad paths to that destination and stored in memory area 512. At step 610, the highest ranked permitted path remaining in the routing information base, not including the just removed path, is determined. At decision step 611, a determination is made whether this newly computed path is different than the original path, $P_{old}$. If it is different, then at step 612, the new history is set to ($- P_{old}$). A determination is then made, at decision step 613, whether the newly computed path, $P_{new}$, is equal to the original path, $P_{old}$. Similarly, this same determination, at step 613, is made directly following step 611 if the newly computed path is not different than the original path, $P_{old}$. Further, if, at step 608, no cycle is found in the history computed at step 607, then the protocol proceeds directly to step 613 to determine whether $P_{new}$ is equal to the original $P_{old}$. If, at step 613, $P_{new}$ is equal to the original $P_{old}$ from any of these three possible input flow-paths, then the routing table need not be updated with a new path and the processor goes back to sleep, at step 606. However, if $P_{new}$ is determined at step 613 not to be equal to $P_{old}$, then, at step 614, the routing table entry for the path between the router and the particular destination is updated with $P_{new}$ and its associated history $h_{new}$. At step 615, then, a routing message is sent to each peer router, that indicates for the particular destination, the path this router will thereafter take and the history associated with it. Once these routing messages are sent, the processor goes back to sleep, at step 606, to await reawakening again, at step 601, when a routing message is again chosen for the same or different destination at the same or different input queue of unprocessed routing messages from peer routers.

The foregoing merely illustrates the principles of the invention. It will thus be appreciated that those skilled in the art will be able to devise various arrangements which, although not explicitly described or shown hereinabove, embody the principles of the invention and are included within its spirit and scope. Furthermore, all examples and conditional language that have been recited herein are principally intended expressly to be only for pedagogical purposes to aid the reader in understanding the principles of the invention and the concepts contributed by the inventors to furthering the art, and are intended to be construed as being without limitation to such specifically recited examples and conditions. Moreover, all statements that have been made herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagram of the router used herein represents a conceptual views of illustrative circuitry embodying the principles of the invention. Similarly, it will be appreciated that the flow charts and pseudocode that have been used herein represent various processes which may be substantially represented in computer readable medium and so executed by a computer or processor.

The functions of the various elements shown in the FIGS., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

The invention claimed is:

1. A method at a first router comprising:
   a) selecting for processing a routing message received from one peer router from among a group of a plurality of peer routers of the first router, the routing message comprising a path from the peer router to a destination end router and an associated path history associated with that path, the path history indicating a sequence of any number of path change events that allowed the one peer router to adopt that path;
   b) determining a new path from the first router to the destination end router from a set of stored paths to the destination end router and the path in the routing message;
   c) dynamically computing a new path history associated with the determined new path; and
   d) sending the determined new path and its associated new path history to one or more of the plurality of peer routers.

2. The method of claim 1 wherein determining the new path comprises choosing as the new path the highest ranked permitted path from the first router to the destination end router from a rank-ordered set of permitted paths, and determining whether that new path is different than the old path from the first router to the destination end router.

3. The method of claim 2 wherein when the new path is determined to be different than the old path, dynamically computing the history of the new path as a function of whether the rank order of the new path is lower, higher, or equal to the rank order of the old path.

4. The method of claim 3 wherein when the rank order of the old path is lower than the rank order of the new path, then the history of the new path is a combination of a signed new path with a path history, the sign indicating that the new path is ranked higher than the old path and the path history indicating a sequence of events that led to the one peer router to adopt a specific sub-path of the new path.

5. The method of claim 3 wherein when the rank order of the old path is higher than the rank order of the new path, then the history of the new path is a combination of a signed old path with a path history, the sign indicating that the new path is ranked lower than the old path and the path history indicating a sequence of events that led to the one peer router to abandon a specific sub-path of the old path.

6. The method of claim 1 further comprising,
   e) after dynamically computing the new path history, determining whether there is a cycle present in the new path history determined in step b).

7. The method of claim 6 further comprising, when in step e) a cycle is determined to be present in the new path history determined in step b):
   f) determining a newer path from the first router to the destination end router from the set of stored paths to the destination and the path in the routing message, which excludes as being the newer path the new path determined in step b) which associated path history was determined in step e) to contain the cycle.

8. The method of claim 7 further comprising determining whether the newer path determined in step f) is different than the original old path, and when it is different, setting the history of the newer path determined in step f) to a function of the history of the original old path.

9. The method of claim 1 wherein the routing message selected for processing from the one peer router is the oldest unprocessed received routing message from the one peer router.

10. A router comprising:
    means for selecting for processing a routing message received from one peer router from among a group of a plurality of peer routers of the first router, the routing message comprising a path from the peer router to a destination end router and an associated path history associated with that path, the path history indicating a sequence of any number of path change events that allowed the one peer router to adopt that path;
    means for determining a new path from the first router to the destination end router from a set of stored paths to the destination end router and the path in the routing message; and
    means for dynamically computing a new path history associated with the determined new path.

11. The router of claim 10 wherein the means for determining the new path comprises means for choosing as the new path the highest ranked permitted path from the first router to the destination end router from a rank-ordered set of permitted paths, and means for determining whether the new path is different than the old path from the first router to the destination end router.

12. The router of claim 11 wherein when the new path is determined to be different than the old path, then the means for dynamically computing the new path history computes the history as a function of whether the rank order of the new path is lower, higher, or equal to the rank order of the old path.

13. The router of claim 12 wherein when the rank order of the old path is lower than the rank order of the new path, then the history of the new path is a combination of a signed new path with a path history, the sign indicating that the new path is ranked higher than the old path and the path history indicating a sequence of events that led to the one peer router to adopt a specific sub-path of the new path.

14. The router of claim 12 wherein when the rank order of the old path is higher than the rank order of the new path, then the history of the new path is a combination of a signed old path with a path history, the sign indicating that the new path is ranked lower than the old path and the path history indicating a sequence of events that led to the one peer router to abandon a specific sub-path of the old path.

15. The router of claim 10 further comprising means for determining whether there is a cycle in the new path history.

16. The router of claim 15 wherein when a cycle is determined to be present in the new path history, then the means for determining a new path determines a newer path from the router to the destination end router from the set of stored paths to the destination and the path in the selected received routing message from the one peer router, which excludes as being the newer path the new path which associated path history was determined to contain the cycle.

17. The router of claim 10 wherein the routing message selected for processing from the one peer router is the oldest unprocessed received routing message from the one peer router.

18. A computer readable media tangibly embodying a program of instructions executable by a computer to perform at a first router a method for exchanging routing information with a group of a plurality of peer routers, the method comprising:
 a) selecting for processing a routing message received from one of the peer routers, the routing message comprising a path from the peer router to a destination end router and an associated path history associated with that path, the path history indicating a sequence of any number of path change events that allowed the one peer router to adopt that path;
 b) determining a new path from the first router to the destination end router from a set of stored paths to the destination end router and the path in the routing message;
 c) dynamically computing a new path history associated with the determined new path; and
 d) sending the determined new path and its associated new path history to one or more of the plurality of peer routers.

19. The media of claim 18 wherein in the method determining the new path comprises choosing as the new path the highest ranked permitted path from the first router to the destination end router from a rank-ordered set of permitted paths, and determining whether that new path is different than the old path from the first router to the destination end router.

20. The media of claim 19 wherein in the method when the new path is determined to be different than the old path, dynamically computing the history of the new path as a function of whether the rank order of the new path is lower, higher, or equal to the rank order of the old path.

21. The media of claim 20 wherein in the method when the rank order of the old path is lower than the rank order of the new path, then the history of the new path is a combination of a signed new path with a path history, the sign indicating that the new path is ranked higher than the old path and the path history indicating a sequence of events that led to the one peer router to adopt a specific sub-path of the new path.

22. The media of claim 20 wherein in the method when the rank order of the old path is higher than the rank order of the new path, then the history of the new path is a combination of a signed old path with a path history, the sign indicating that the new path is ranked lower than the old path and the path history indicating a sequence of events that led to the one peer router to abandon a specific sub-path of the old path.

23. The media of claim 18 wherein the method further comprises,
 e) after dynamically computing the new path history, determining whether there is a cycle present in the new path history.

24. The media of claim 23 wherein the method further comprises,
 f) when a cycle is determined to be present in the new path history, determining a newer path from the first router to the destination end router from the set of stored paths to the destination end router and the path in the routing message, which excludes as being the newer path the new path determined in step b) which associated path history was determined in step c) to contain the cycle.

25. The media of claim 24 wherein the method further comprises determining whether the newer path is different than the original old path, and when it is different, setting the history of the newer path to a function of the history of the original old path.

26. The media of claim 18 wherein in the method the routing message selected for processing from the one peer router is the oldest unprocessed received routing message from the one peer router.

* * * * *